US006820782B1

(12) United States Patent
Monson

(10) Patent No.: US 6,820,782 B1
(45) Date of Patent: Nov. 23, 2004

(54) RELEASABLE SADDLEBAG SYSTEM FOR MOTORCYCLES

(76) Inventor: Brant Monson, 3875 N. Cove Dr., Provo, UT (US) 84604

( * ) Notice: Subject to any disclaimer, the term of this patent is extended or adjusted under 35 U.S.C. 154(b) by 168 days.

(21) Appl. No.: 10/035,599

(22) Filed: Oct. 19, 2001

(51) Int. Cl.⁷ .................................................. B62J 9/00
(52) U.S. Cl. ........................ 224/413; 224/430; 224/431
(58) Field of Search ................................. 224/413, 430, 224/431, 347; 70/18, 38 R, 58, 59; 292/302, 341.15; 280/202

(56) References Cited

U.S. PATENT DOCUMENTS

| | | | | |
|---|---|---|---|---|
| 2,331,851 A | * | 10/1943 | Spooner | 411/348 |
| 4,542,839 A | * | 9/1985 | Levine et al. | 224/431 |
| 4,759,671 A | * | 7/1988 | Duran | 411/347 |
| 4,993,731 A | | 2/1991 | Fuller | |
| 5,381,707 A | * | 1/1995 | Gill | 74/546 |
| 5,558,260 A | * | 9/1996 | Reichert | 224/413 |
| 5,667,232 A | * | 9/1997 | Gogan et al. | 280/202 |
| 6,053,384 A | * | 4/2000 | Bachman | 224/430 |
| 6,293,450 B1 | * | 9/2001 | Aron | 224/430 |
| 6,318,924 B1 | | 11/2001 | Schiavo, Jr. | |
| 6,443,344 B1 | * | 9/2002 | Nicosia et al. | 224/413 |

* cited by examiner

Primary Examiner—Stephen K. Cronin
Assistant Examiner—Maerena W. Brevard
(74) Attorney, Agent, or Firm—Bateman IP Law Group

(57) ABSTRACT

A quick release saddlebag system includes a saddlebag and a mounting structure which enables quick removal of the saddlebag from a motorcycle without the use of tools. The mounting structure typically includes a mounting bolt attached to the motorcycle, and a mounting pin carrying the saddlebag. The mounting pin is selectively attached to the mounting bolt to enable removal of the saddlebag by simply removing the mounting pin.

24 Claims, 12 Drawing Sheets

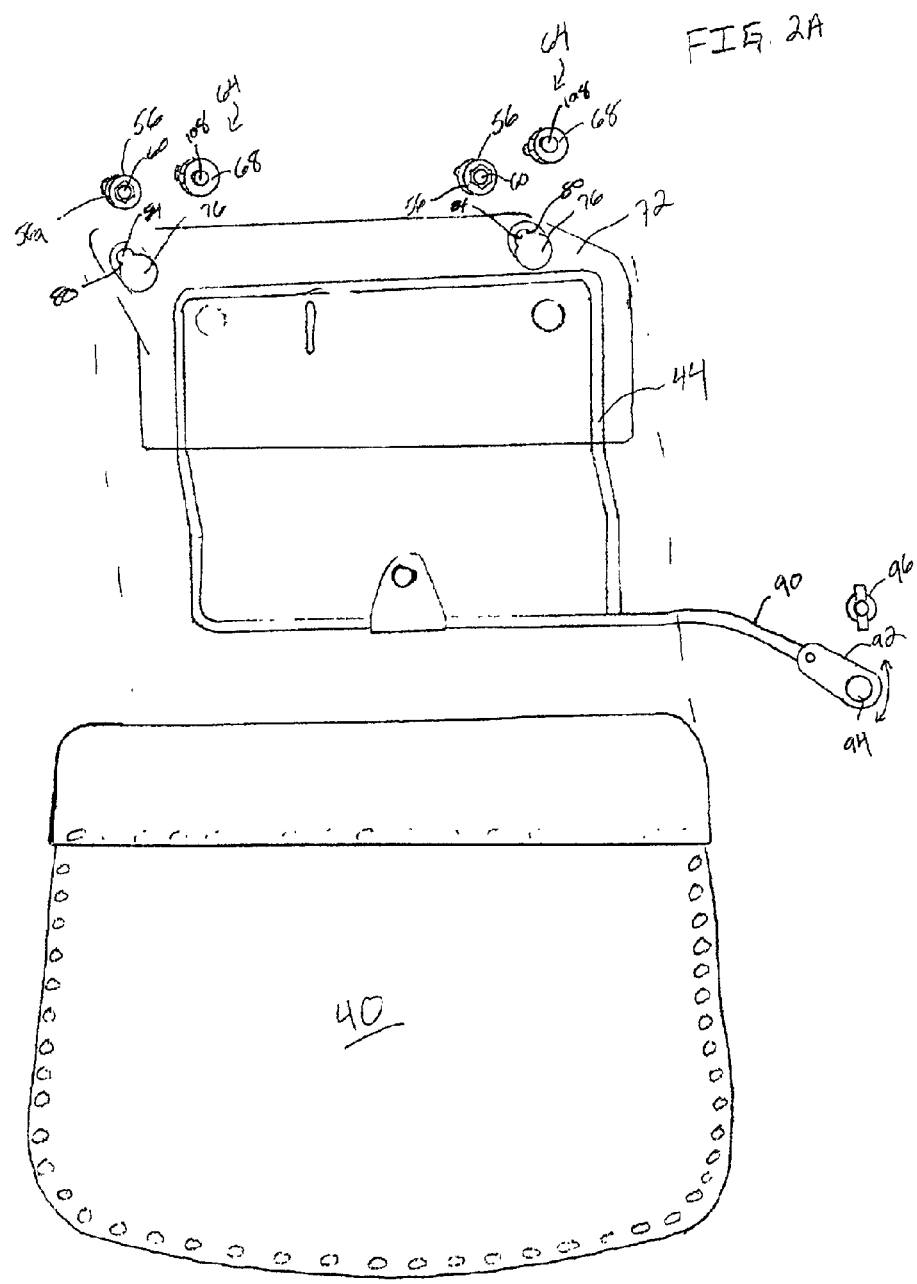

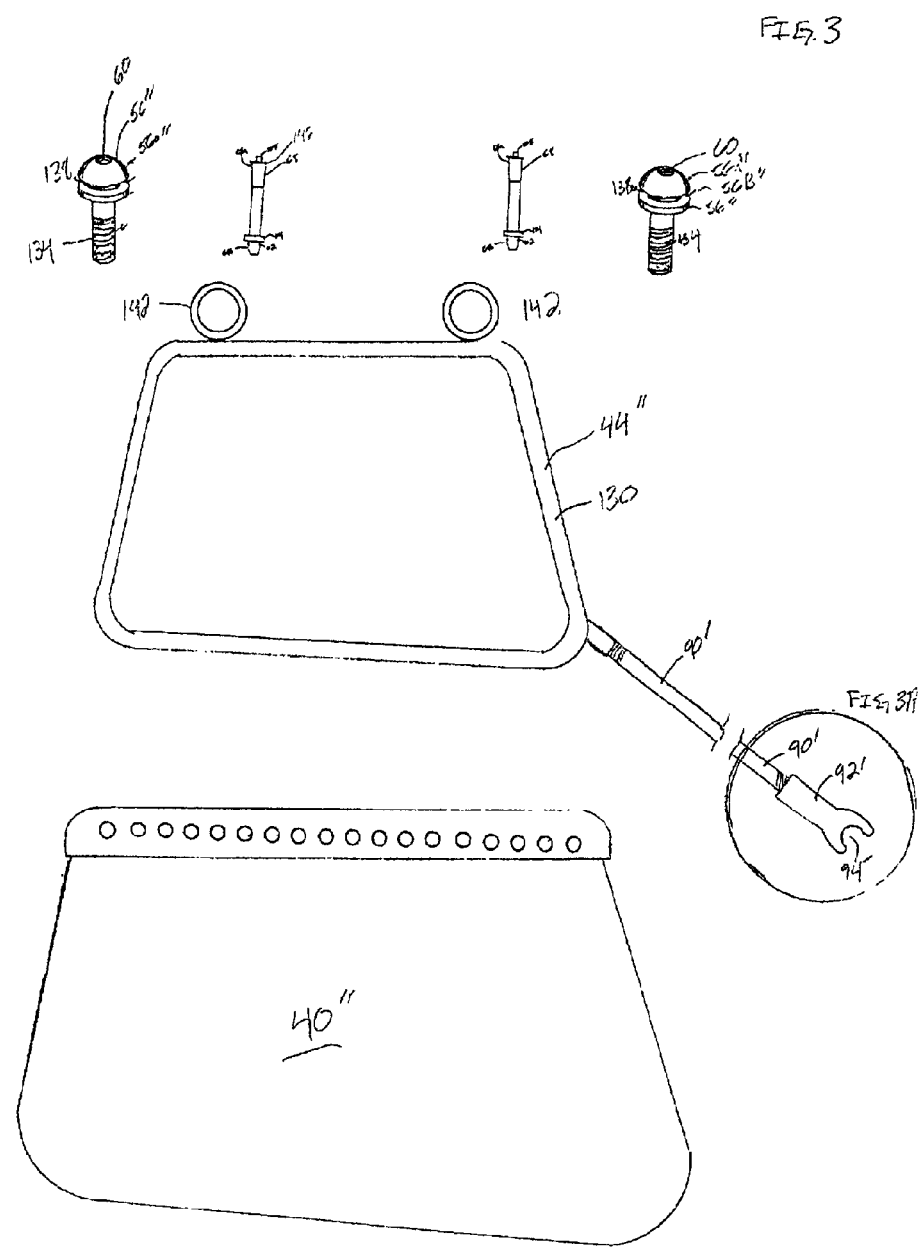

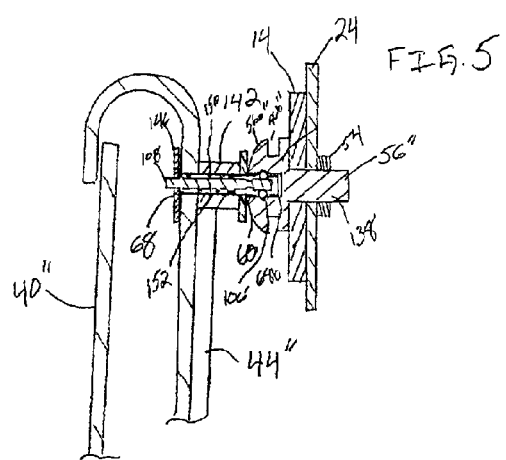

RELEASABLE SADDLEBAG SYSTEM FOR MOTORCYCLES

BACKGROUND OF THE INVENTION

1. Field of the Invention

The present invention relates to a saddlebag for motorcycles which are releasably attached to the motorcycle. More specifically, the present invention relates to saddlebags which are attached to a motorcycle in such a manner that they can be quickly removed from the motorcycle, preferably without tools. Furthermore, the present invention relates to a mounting system by which the mounting hardware does not detract from the appearance of the motorcycle.

2. State of the Art

The use of saddlebags on motorcycles has been commonplace for a number of years. Because motorcycles typically lack trunks or other storage space, saddlebags are often the only alternative available to carry bulky items. This is especially true when the motorcycle is being ridden over long distances, such as when touring. The saddlebags allow for storage of items to keep the items from being damaged. Storing the items also allows the rider to keep his or her hands free to operate the motorcycle.

While saddlebags come in a variety of configurations, most saddlebags attach to the frame of the motorcycle toward one extreme or the other of the motorcycle. The frame provides support to the saddlebag and its contents, and keeps the saddlebag out of the operator's way. Most commonly, the saddlebags are mounted adjacent to the rear wheel of the motorcycle.

Referring to FIG. 1A, there is shown one common configuration for attaching motorcycle saddlebags. The motorcycle, generally indicated at 10, includes a motorcycle fender strut 14 which extends from a position adjacent to the seat 18, to a position adjacent to top of the rear wheel 22 so as to hold the fender 24 above the wheel.

Disposed along the motorcycle fender strut 14 are a plurality of bolts 26 which are used to support the saddlebag (not shown in FIG. 1A). The bolts 26 are attached to the fender strut 14 in such a way as to enable removal of the saddlebags in the manner discussed in detail below. When the saddlebags are removed, however, the bolts 26 extend two to three inches from the fender strut 14. The bolts 26 are both unattractive and can pose a risk of injury from someone accidentally bumping into the bolts.

The bolts 26 can be removed from the fender strut 14. However, removal of the bolts 26 is a time consuming, inconvenient process. Additionally, some other structure must be used to cover the holes in the fender strut 14 which previously held the bolts 26.

The saddlebag is also supported by a support peg 28 which is disposed at the rearward end of a rod 30 extending rearwardly from the motorcycle adjacent the wheel 22. The saddlebag typically includes a frame (discussed below) which fits over the support peg 28.

Turning now to FIG. 1B, there is shown a side view of the motorcycle 10 with a saddlebag 40 attached to the motorcycle's fender strut 14 so that the top 40 of the saddlebag is positioned adjacent the strut. The saddlebag 40 is typically attached to the motorcycle's fender strut 14 by a saddlebag frame 44 which is disposed on the side of the saddlebag adjacent the wheel 22. A portion of the saddlebag frame 44 extends forwardly and connects the saddlebag to the rod 30, thereby providing additional stability to the saddlebag.

FIG. 1C shows an exploded view of the saddlebag 40 and the saddlebag frame 44 shown in FIG. 1B. The saddlebag 40 attaches to the saddlebag frame 44, which, in turn, is attached to the motorcycle frame portion 14 by the bolts.

Such saddlebag/frame configurations are commonplace and work well for transporting items on motorcycles. During the use of a motorcycle, however, the are many situations in which a user will desire to remove the saddlebag. One common scenario is when cleaning the motorcycle. Because the saddlebags are often made of leather, it is not desirable to have the saddlebag remain on the motorcycle 10 during cleaning. Thus, the saddlebag will usually be removed from the motorcycle.

Removing the saddlebag 40 from the motorcycle 10 is a difficult and time consuming process. Typically, the bag is removed from the saddlebag frame 44 by unscrewing several screws which extend from the saddlebag into the saddlebag frame. If the saddlebag 40 is full, some of the contents may need to be removed before the saddlebag is removed from the saddlebag frame. If desired, the saddlebag frame 44 can also be removed. However, this exposes the bolts 26 which are generally unattractive, as they stick out between 2 and 3 inches from the fender strut 14.

As shown in FIG. 1D, the saddlebag 40 is held to the fender strut 14 by the bolt 26. The bolt 26 includes a first end 26a which is inserted through a hole 52 in the fender strut 14 and fender 24. A nut 54 is used to secure the bolt 26 in place.

Adjacent to the fender strut 14 is a spacer 60 which is held in place by a head 64 of the bolt 26. The saddlebag 40 is disposed on the opposing side of the head 64 and is secured in place by a nut 68 on the opposing second end 26b of the bolt 26.

To remove the saddlebag 40, the nut 68 is removed, thereby allowing the saddlebag 40 to be pulled off of the bolt 26. This leaves the bolt 26 and spacer 60 extending from the fender strut 14. To remove the bolt 26, the rider must reach up under the, fender and remove the nut 54. This procedure is awkward and can take up to 15 minutes. It also brings the rider into contact with the tire and the grime which often develops under the fender 24. Thus, it is not uncommon to leave the bolts in place and tolerate their unsightly appearance when washing the motorcycle or otherwise removing the saddlebag 40.

Another situation when removing the saddlebags 40 is desirable is when traveling. Because the saddlebags 40 often contain the clothing and other possessions of the rider, it is advantageous to be able to easily remove the saddlebag to take it into the hotel, etc. The prior art configuration show above, however, requires the use of tools to remove the saddlebag 40. Additionally, if the saddlebags 40 are left on the motorcycle, there is a possibility that they will be damaged or stolen.

Thus, there is a need for a saddlebag for use with motorcycles which can be quickly and easily attached to and removed from the motorcycle. Such a saddlebag should be easy to use while preventing accidental removal of the saddlebag. Such a saddlebag should preferably also enable attachment and removal without the use of tools.

Because of the distinct advantages which can be achieved by having saddlebags which can be readily removed without tools, there have been numerous attempts to provide quick release saddlebags. Unfortunately, the presently available systems either leave bulky hardware on the motorcycle, sometimes presenting safety hazzards. Other configurations allow the saddlebag to fall off or drag on the ground during a ride. Some configurations also have no mechanism to prevent the bags from being removed by a thief, etc. Because saddlebags are expensive, it is highly desirable to have the saddlebags remain on the motorcycle and to be removed only by an authorized person.

SUMMARY OF THE INVENTION

It is an object of the present invention to provide a releasable saddlebag for use with motorcycles.

It is another object of the present invention to provide a releasable saddlebag which can be attached to and removed from the motorcycle in a fraction of the time required for conventional saddlebags.

The above and other objects of the invention are achieved by a releasable saddlebag system for motorcycles including a saddlebag and a frame which are removable from the motorcycle without the requirement of tools.

In accordance with one aspect of the invention, the saddlebag frame is mounted on the motorcycle with a quick-release mounting system which enables the saddlebag frame to be removed from the motorcycle frame with little time and effort. Furthermore, the brackets used to anchor the saddlebag frame to the frame of the motorcycle are configured to give the appearance of rivets or other fasteners commonly used on a motorcycle, rather than the unsightly bolts used in the prior art.

In accordance with another aspect of the present invention, the saddlebag is configured to be attached and removed from the saddlebag frame without the use of tools. By simply disengaging the attachment structure of the saddlebag from the bracket structure which holds the saddlebag frame to the frame of the motorcycle, the saddlebags can be quickly removed from the saddlebag frames, and transported to any desired location.

In accordance with still another aspect of the present invention, the saddlebag attachment mechanism is configured to enable virtually instantaneous removal of the saddlebag from the motorcycle.

In accordance with still yet another aspect of the present invention, if desired, the mounting structure used to secure the saddlebag frame to the frame of the motorcycle can also be used to releasably attach a sissy bar to the motorcycle, either alternatively or concurrently with the saddlebags.

In accordance with still yet another aspect of the present invention, a locking mechanism can be added to the saddlebag mounting pin to prevent unauthorized removal of the pin, while providing minimal increase in time necessary to remove the saddlebags.

BRIEF DESCRIPTION OF THE DRAWINGS

The above and other objects, features and advantages of the invention will become apparent from a consideration of the following detailed description presented in connection with the accompanying drawings in which:

FIG. 2A show an exploded view of a saddlebag and attachment configuration, and a close-up view of the mounting structure shown in FIG. 2, respectively.

FIGS. 3 and 3A show an exploded view of a saddlebag, saddlebag frame and mounting structure in accordance with the principles of the present invention, and a close-up view of the attachment member at the end of the extension arm, respectively;

FIG. 5 shows a cross-sectional view of a saddlebag, saddlebag frame, motorcycle frame and mounting structure in accordance with the principles of the present invention;

DETAILED DESCRIPTION

Reference will now be made to the drawings in which the various elements of the present invention will be given numeral designations and in which the invention will be discussed so as to enable one skilled in the art to make and use the invention. It is to be understood that the following description is only exemplary of the principles of the present invention, and should not be viewed as narrowing the pending claims.

Figure 2:
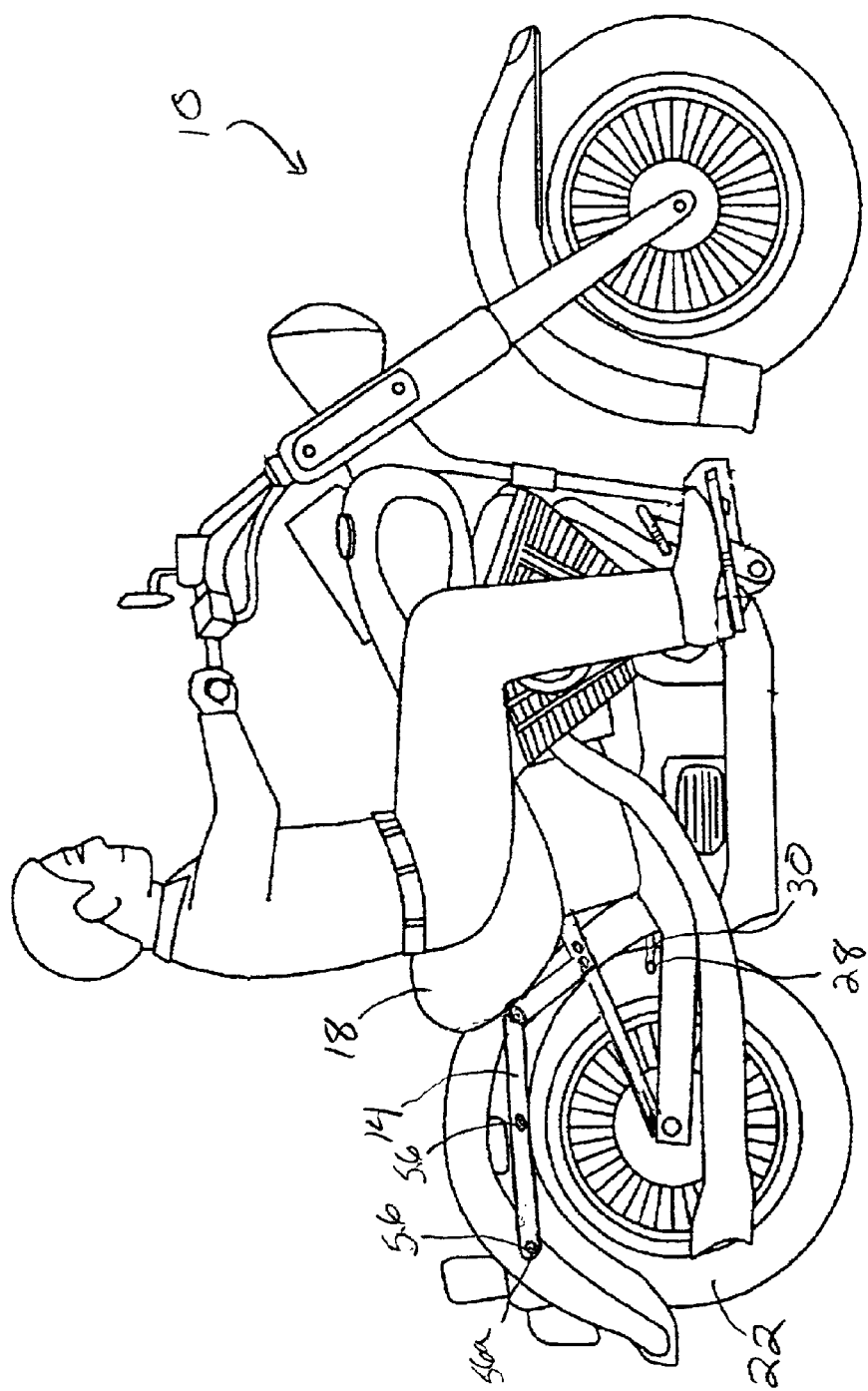
FIG. 2 shows a motorcycle configured with a saddlebag mounting structure in accordance with the principles of the present invention.

Referring to FIG. 2, there is shown a side view of a motorcycle, generally indicated at 10. The motorcycle 10 includes a motorcycle fender strut 14 which extends from a position adjacent the seat 18, to a position adjacent to top of the rear wheel 22 so as to hold the fender 24 above the wheel.

Figure 1A:
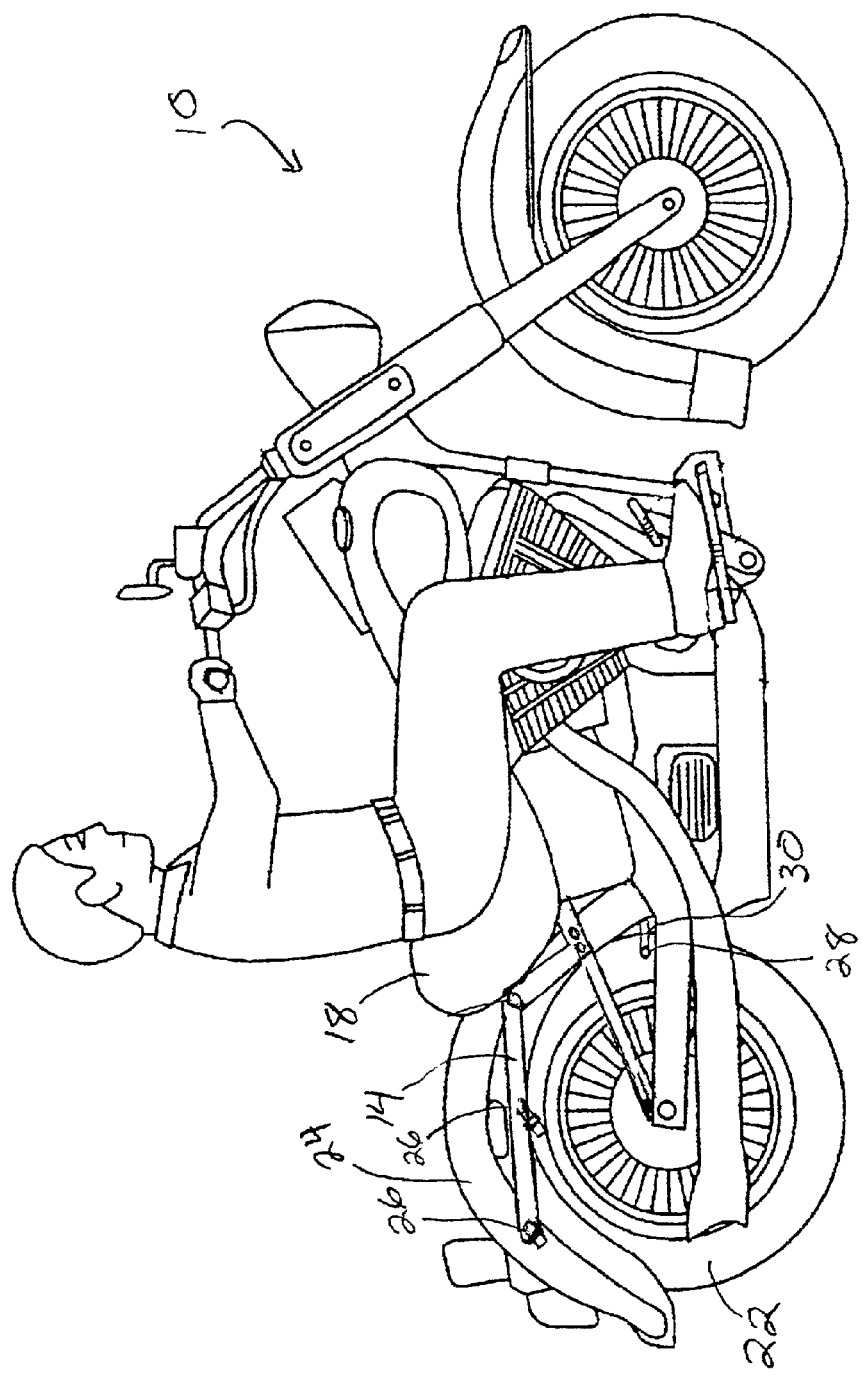
FIG. 1A shows a side view of a motorcycle configured in accordance with the principles of the prior art without a saddlebag.
Figure 1B:
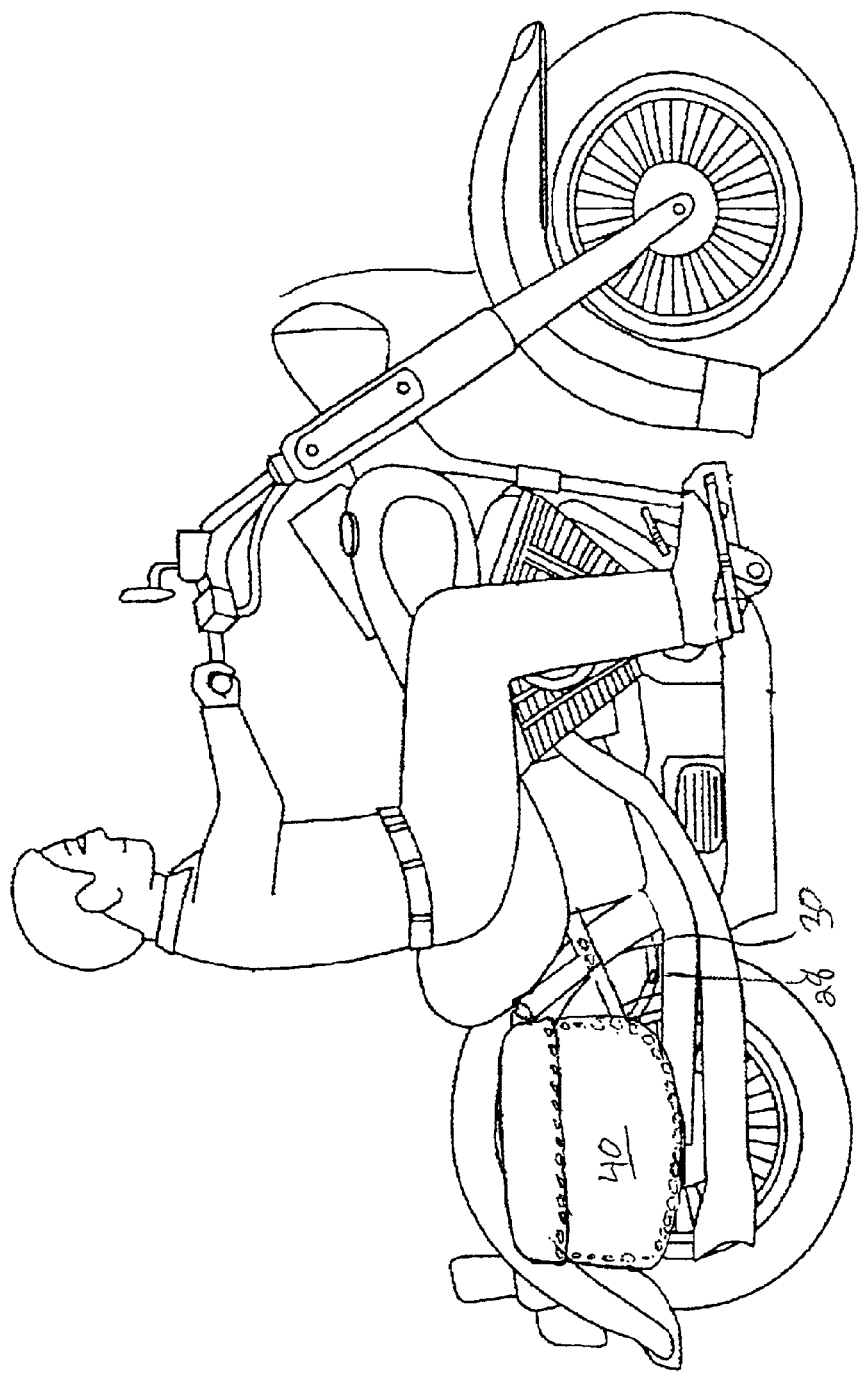
FIG. 1B shows a side view of the motorcycle of FIG. 1A with a prior art saddlebag configuration attached to the motorocycle.
Figure 1C:
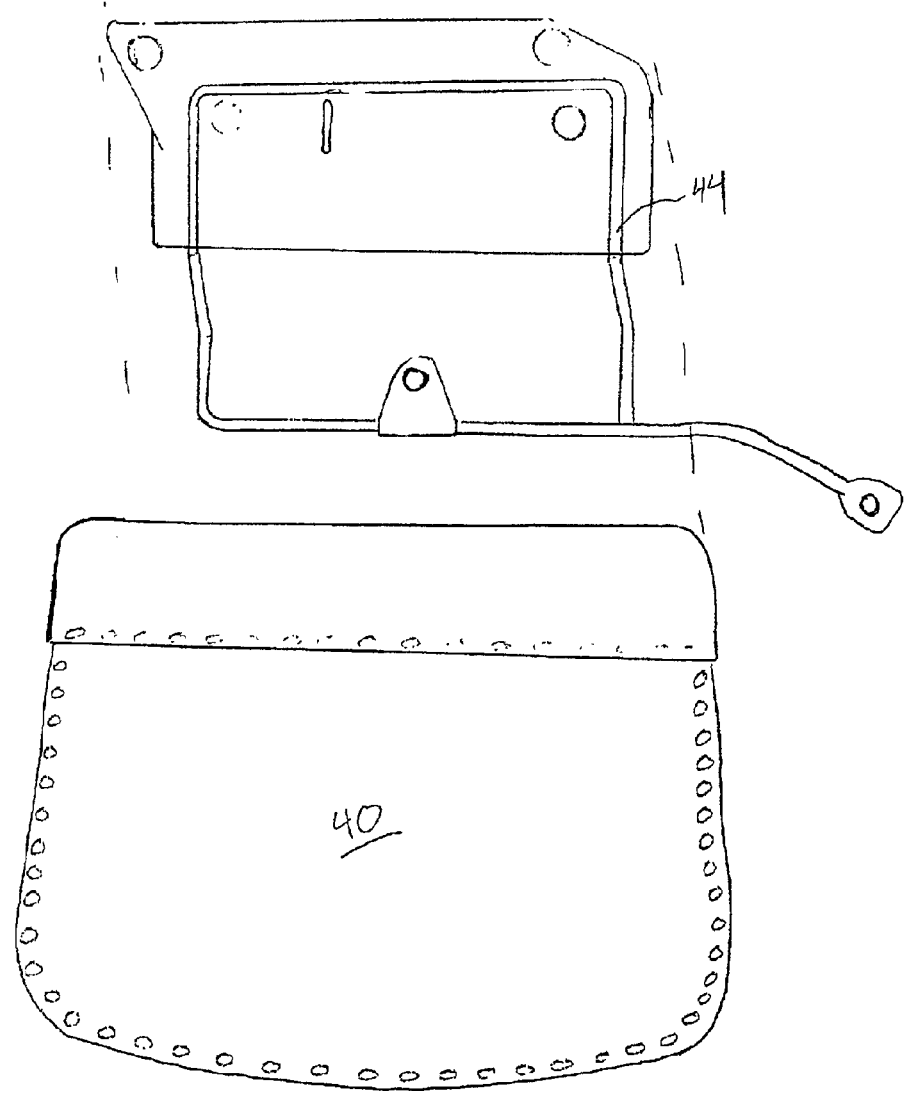
FIG. 1C shows an exploded view of a prior art saddlebag and saddlebag frame.
Figure 1D:
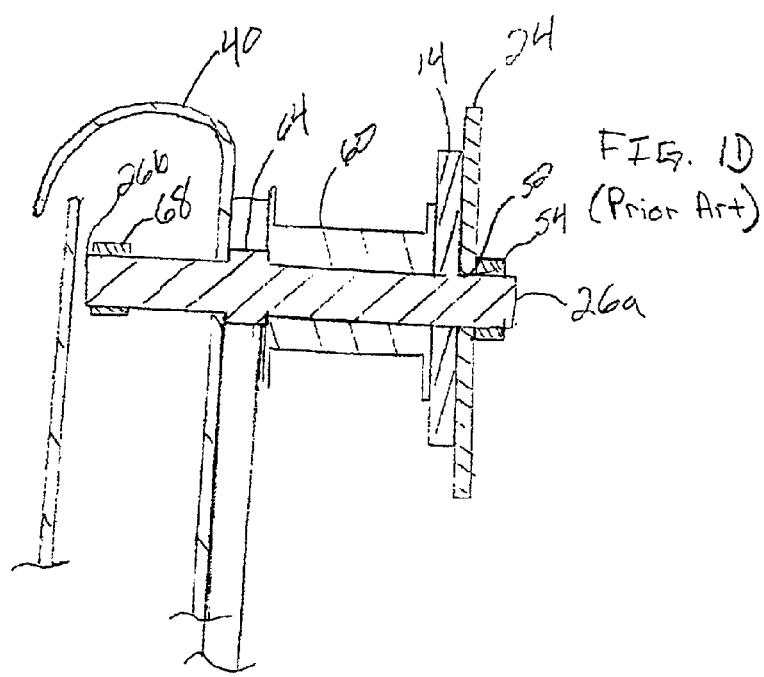
FIG. 1D shows a cross-sectional view of a prior art attachment of a saddlebag frame and saddlebag to the frame of the motorcycle.

Disposed along the motorcycle fender strut 14 are a plurality of bolts 56 which are used to support the saddlebag (not shown in FIG. 1A). The bolts 56 are attached to the fender strut 14 in such a way as to enable removal of the saddlebags in the manner discussed in detail below. When the saddlebags are removed, as shown in FIG. 2, the bolts 56 do not extend two to three inches from the fender strut 14 as in the prior art shown in FIG. 1A. Rather, the bolts 56 appear to be nothing more than rivets with a small hole drilled in each. In such a configuration, the bolts will not catch on the rider's clothing and do provide an aesthetically pleasing look.

As will be explained in additional detail below, the hole 60 in the head 56a of the bolts 56 is contoured to hold a retention member in the form of a mounting pin. Typically the contour will comprise an annular groove which receives the retractable ball(s) from a "military" or "ball" pin. A pair of detents could also be used. The contours, however, are disposed inside the head of the bolt. Thus, the bolts for a mounting system on the motorcycle which is barely noticeable. This is in sharp contrast to the prior art bolts 26 which extended several inches from the fender strut 14.

Turning now to FIG. 2A, there is shown an exploded view of a saddlebag 40', saddlebag frame 44' and the mounting structure, generally indicated at 64. The mounting structure 64 includes bolts 56 which are mounted on the fender strut (not shown in FIG. 2A) and mounting pins 68 which are configured to engage the head 56a of the bolts 56 mounted in the fender strut 14.

Figure 2C:
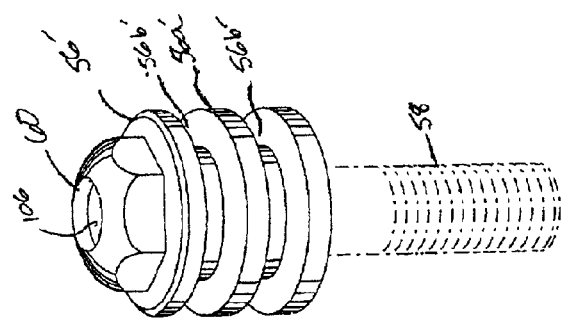
FIGS. 2B, 2C and 2D how a perspective view of alternate mounting bolts for mounting saddlebags and a sissy bar on the motorcycle's fender strut, and side view of a mounting pin for engaging either of the mounting bolts.
Figure 2B:
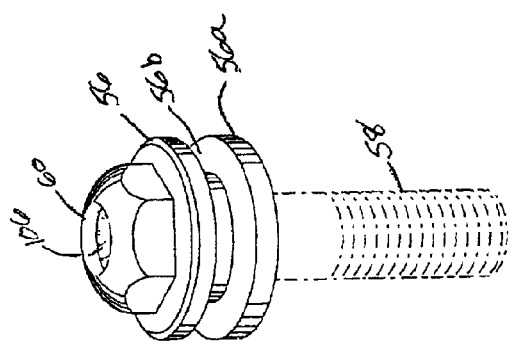

Referring momentarily to FIGS. 2B and 2C, the head 56a and 56a' of the bolts 56 and 56' have one or more annular channels 56b and 56b' which are configured to receive the side plate 72 of the saddlebag frame 44'. The bolts 56 and 56' also include a threaded shank 58 which is shown in shadow, as this portion is usually concealed from view by the fender strut 14 and fender 24 of the motorcycle.

Returning to FIG. 2A, the side plate 72, and thus the saddlebag frame 44' are mounted on the bolts 56 by positioning the head 56a of the bolts into associated holes 76 in the side plate and then sliding the side plate so that a lip 80 defining a receiving channel 84 nests into one of the annular channels 56b or 56b' in the head. The receiving channel 84 preferably extends from the hole 76 at an angle of between about 30 and 60 degrees to minimize the tendency of the lip 80 of the side plate 72 to slide out of the head 56a of the bolt 56. (In light of the present disclosure, those skilled in the art will appreciate that a conventional bolt could be used with the receiving channel 84 being configured to receive the shank.)

Once the side plate 72 is properly engaged with the bolts 56 or 56', an extension arm 90 of the saddlebag frame 44' engages the peg 28 on the motorcycle. As shown in FIG. 2A, the extension arm preferably has a pivoting attachment member 92 to facilitate attachment to the peg 28. The peg 28 passes through a hole 94 in the attachment member 92 and is secured by a wing-nut 96 or other tool-less fastener. This provides a three-point attachment and prevents the side plate 72 from being accidentally removed from the bolts 56 or 56'.

Figure 2D:
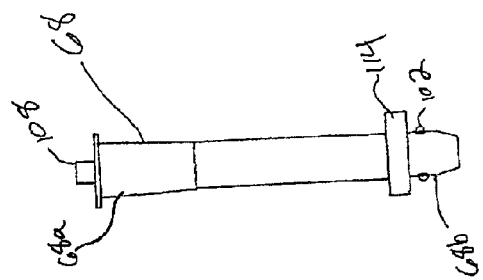

The saddlebag frame 44' is mounted on the bolts 56, thereby mounting the saddlebag 40' to the bolts, by inserting the mounting pins 68 which extend through the rear of the bag into the holes 60 in the bolts. The mounting pins 68 are preferably military pins which use a spring or other compression system to force one or more balls 102 (FIG. 2D) to extend from the body 104 of the pin and engage an annular groove 106 (FIGS. 2B and 2C) in the head 56a of the bolts. While not required, the mounting pins 68 typically require a small press on the release button 108 at the head 68a of the pin to allow the distal end 68b of the pin to enter the hole 60 in the bolt. Once the mounting pin 68 is in the hole 60, the release button 68a is released so that the ball(s) 102 of the pin extend out into the groove 106. The ball(s) 102 of the mounting pin 68 hold the saddlebag 40' to the bolts 56 and will not twist out under vibration, as a threaded bolt might.

To remove the saddlebag 40' the rider need only press the release button 108 on the head 68a of each pins 68 and pull slightly away from the motorcycle. The pins 68 preferably have a retaining ring 114 disposed thereon to keep the pins from being pulled out of the saddlebag 40' as they are withdrawn from the bolts 56. As will be appreciated, the use of the mounting pins 68 enables the saddlebag 40 to be removed in seconds, and without the use of any tools. If desired, a lock can also be used to prevent use of the release button 108, thereby preventing unauthorized removal of the bags. A more detailed discussion of locking mechanisms is provided below with respect to FIGS. 7A through 7C.

Once the saddlebag 40' has been removed, the saddlebag frame 44' can be removed by simply undoing the wing nut 96 or other retainer used to hold the arm 90 to the peg 28, and then lifting upwardly and rearwardly so that the bolt heads 56 or 56' slide out of the receiving channels 84. In all, removal of both the saddlebag 40' and the frame 44' can be accomplished less than 10 to 15 seconds without the use of tools. Once the saddlebag 40' and frame 44' are removed, the motorcycle 10 has an appearance which is substantially the same as a stock motorcycle without saddlebag mounting hardware.

Turning specifically to FIGS. 2C, there is shown a bolt 56' having a head 56a' with two annular channels 56b'. One of the channels 56b' is used for receiving the saddlebag frame 44'. The other channel 56 can be used to receive an attachment mechanism for a removable sissy bar as described in U.S. Pat. No. (U.S. patent application Ser. No. 09/771,119, filed Jan. 26, 2001), the entirety of which is herein incorporated by reference.

Those familiar with riding motorcycles will appreciate that many riders do not like saddlebags or sissy bars because when they are removed, either the mounting hardware must be removed, or the unsightly structures remain on the motorcycle. In contrast, the present invention leaves only a bolt head 56 or 56' extending from the fender strut 14. Additionally, many consider the bolt head 56 or 56' to be more aesthetically pleasing than the stock bolt,head which comes with the motorcycle.

Turning now to FIGS. 3 and 3A, there are shown an exploded view of an alternate configuration of the saddlebags 40" and related structures, and a close-up view of the engagement between the extension arm and the peg of the motorcycle, respectively. The saddlebags 40" shown in FIG. 3 are different than those discussed with respect to FIG. 2 in that they are typically fixedly mounted on the saddlebag frame 44". This is typically accomplished by riveting the saddlebag 40" to the tubing 130 or to some structure carried by the tubing. Of course, other types of fasteners can be used to hold the saddlebag 40" to the saddlebag frame 44" and a variety of bag and frame configurations can also be used.

The saddlebag 40" is mounted to the motorcycle (not shown in FIG. 3) by positioning a mounting bolt 56" through the fender strut in the manner discussed above. The mounting bolt 56' has a head 56a" with a hole 60 for receiving the distal end 68b of a mounting pin 68. The head 56a" can also include an annular channel 56b' to receive a detachable sissy bar, if desired. It is important to note, however, that the head 56" can omit the annular channel so that it merely has a dome shaped appearance similar to that of a rivet.

In mounting the mounting bolt 56" on the fender strut, the shank is placed through the hole in the fender strut and a nut is rotated to engage the threads 134 on the shank. The head 56a' is held in place by inserting an allen wrench or similar tool into a small hole 138 in the head. As shown in FIG. 3, the hole is in the channel 56b". If a rounded head is used without a channel, the hole 138 is positioned adjacent the edge of the head 56a" and positioned at the bottom while tightening. Once mounted, the head 56a" extends less than an inch from the motorcycle and is rounded to prevent injury to any who might come in contact with it. Equally important, the head 56a" gives the appearance of a rivet on the fender strut. Thus, when the saddlebag 40' is not placed on the motorcycle, an aesthetically pleasing design is provided and the mounting bolt 56' can be left in place whether the saddlebags are being used or not. This is in sharp contrast to the large, obtrusive bolts which are commonly used to mount prior art saddlebags.

The mounting pin 68 which engages the hole 60 in the mounting bolt 56", extends though the back of the saddlebag 40" and through a pair of mounting rings 142 on the saddlebag frame 44". The mounting rings 142 and the back of the saddlebag 40" back are sandwiched between the retaining ring 114 and the upper flange 146 of the mounting pin 68. Once the mounting bolt 56" is in place, the saddlebag 40" and its attached frame 44" can be mounted by simply pressing on the release button 108 and inserting the distal end 68b of the pin in hole 60. The release button 108 is then released and the saddlebag 40" and frame 44", which are carried on the pin 68, are secured to the fender strut. Because the balls 112 of the pin 68 nest in the groove in the head 56a" of the bolt 56", the saddlebag 40" can withstand considerable pressure without being released from the motorcycle. The only way to remove the saddlebag 40" and saddlebag frame 44" is to again press the release button 108 and pull the pin away from the motorcycle. Of course, this takes only a fraction of a second, and can be achieved without any tools.

The saddlebag frame 44" also preferably includes an extension arm 90'. The extension arm 90' is used to help support the saddlebag 40" and frame 44" and to prevent them from swaying while the motorcycle is moving. At the end of the extension arm 90' is an attachment member 92'. The attachment member 92' defines a U-shaped opening 94' which is typically configured to engage the rear foot peg 28 on the motorcycle.

As discussed above, the peg 28 (FIG. 1A) often extends from the motorcycle. Depending on the configuration of the motorcycle, however, the peg may not be included or may be located where the extension arm does not reach. To resolve these concerns, the U-shaped attachment member 92' can be disposed on the extension arm 90'. The U-shaped attachment member 120 will engage a foot peg 28, thereby leaving no trace when it is removed. If a foot peg is not available, however, some other peg or generally tubular extension can be used to receive the U-shaped attachment member 120. The weight of the saddlebag holds the U-shaped attachment member 120 in contact with the peg 28 when in use. Removal of the frame is simplified, as the U-shaped attachment member 92' does not require removal of a bolt, etc. This renders removal of the saddlebag 40" and the attached saddlebag frame 44" almost instantaneous. The attachment member 92' and extension arm 90' can also be threaded to allow adjustment in the distance between the attachment member and the frame 44".

When the saddlebag 40" and frame 44" are pulled from the motorcycle, the attachment member 92' pulls away from the foot peg 28. This leaves no trace of the saddlebag having been mounted thereon, and takes no additional time.

Thus, in about one to two seconds, the saddlebag 40", frame 44", etc., can be mounted on the motorcycle. The attachment is as simple, or simpler, and is more secure than prior quick release systems. It also avoids the use of tools and enables a rider to quickly take his or her saddlebags off the motorcycle if desired.

Figure 4:
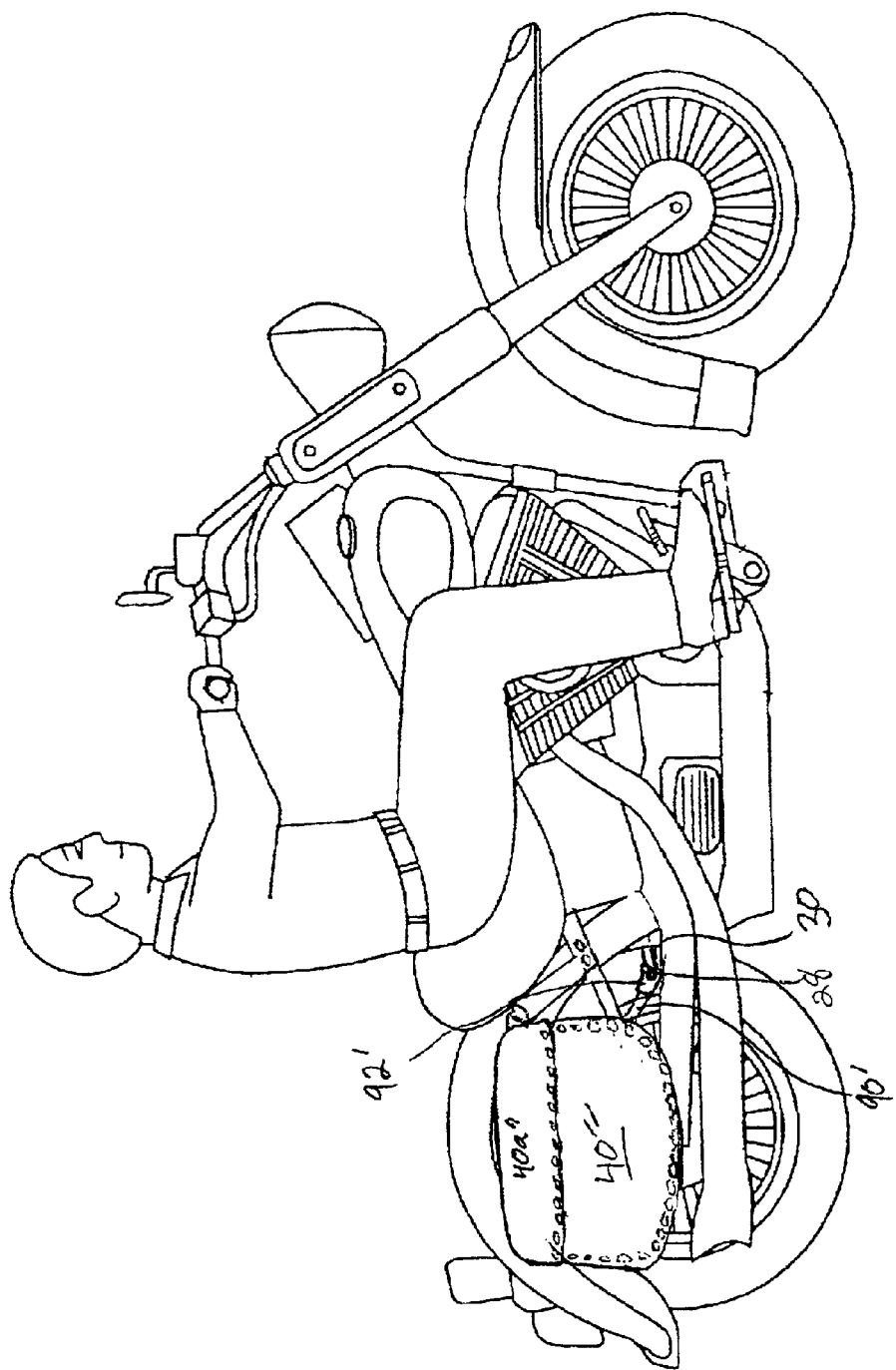
FIG. 4 shows a side view of a motorcycle with saddlebags attached thereto in accordance with the principles of the present invention.

Turning now to FIG. 4, there is shown a side view of a motorcycle having a saddlebag 40" mounted thereon. As seen in FIG. 4, the only noticeable difference between saddlebag's attachment and the other embodiments shown above is the attachment member 92'. When the rider desires to remove the saddlebag 40", he need only raise the cover 40a" sufficiently to reach the mounting pins 68 (FIG. 3) and press on the release buttons 108. The entire saddlebag system will then easily pull away from the motorcycle. Unless the release button 108 is depressed, however, the saddlebag will hold securely to the mounting bolts 56" (FIG. 3) and thus the motorcycle.

Turning now to FIG. 5, there is shown a cross-sectional view of the saddlebag 40", saddlebag frame 44", mounting structures and fender 24 and fender strut 14. The mounting bolt 56" is attached to the fender strut 14 by attaching a nut 54 to the shank 138 of the bolt. Tightening the nut 54 draws the head 56a' against the fender strut 14. As mentioned previously, the head 56a" of the mounting bolt 56" may include an annular channel 56b" for receiving a quick release sissy bar mounting if desired. The annular channel 56b', however, is not required for practicing most aspects of the present invention.

The mounting pin 68 is attached to the mounting bolt 56" by pressing the release button 108 and inserting the distal end 68b of the mounting pin into the hole 60 in the head 56a" of the mounting bolt. Once the balls 112 of the mounting pin 68 align with the groove 106' of the mounting bolt 68, the spring member 150 in the mounting pin 68 forces a center shaft 152 rearwardly, thereby forcing the balls into the groove and preventing the mounting pin from being removed from the mounting bolt. Thus, the saddlebag 40", is securely mounted to the motorcycle.

To remove the saddlebag 40" and saddlebag frame 44", the rider need only press the release button 108 and the entire saddlebag 40", saddlebag frame 44" and mounting pin 68 will release from the motorcycle. The only remaining indication that a saddlebag has been mounted on the motorcycle is the mounting bolt which is barely noticeable, and is more aesthetically pleasing than the conventional bolt head used on the fender strut.

Figure 6A:
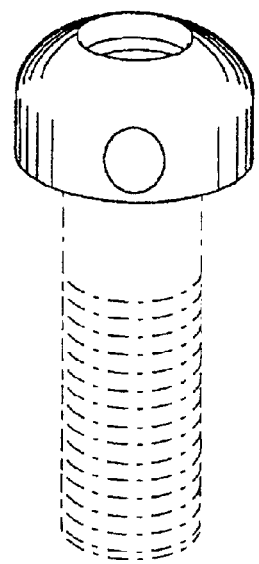
FIGS. 6A and B show other representative configurations of mounting bolts which can be used in accordance with the principles of the present invention.
Figure 6B:
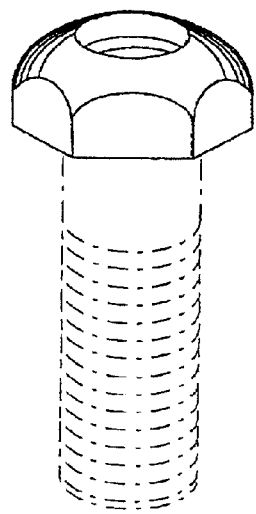

Turning now to FIGS. 6A and 6B there are shown two other configurations for a mounting bolt 56". Unlike the bolt heads 56, 56' and 56" shown above, the bolts shown in FIGS. 6A and 6B lack the annular channel 56b which is not needed for the saddlebag 40" discussed with respect to FIGS. 3 through 5. Without the annular channel 56, a relatively small head remains outside the fender strut and the bolts provide a nice appearance when the saddlebag 40" is not mounted thereon. Furthermore, with a mere press of the release button, the saddlebag 40" can be mounted to the mounting bolts, thereby attaching the saddlebag to the motorcycle without the need for tools.

Figure 7A:
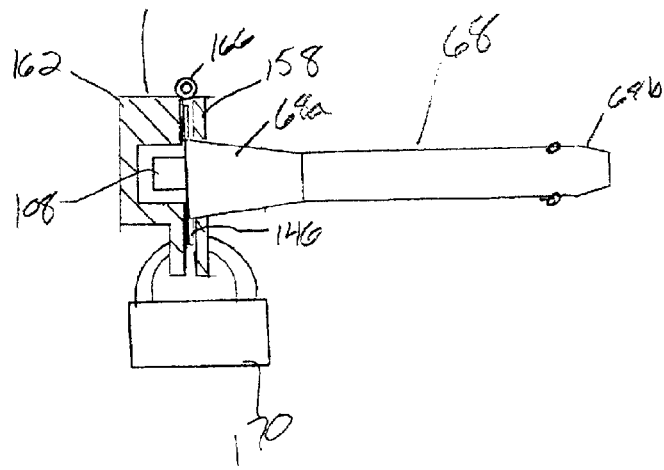
FIG. 7A shows a side cross-sectional view of a locking mechanism disposed on a mounting pin to prevent unauthorized removal of the mounting pin from the mounting bolt.
Figure 7B:
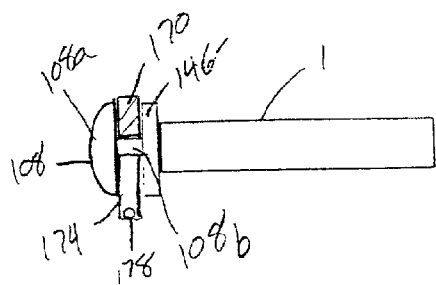
FIG. 7B shows a side cross-sectional view of an alternate embodiment of a portion of a locking mechanism for preventing actuation of an alternate embodiment of a mounting pin.
Figure 7C:
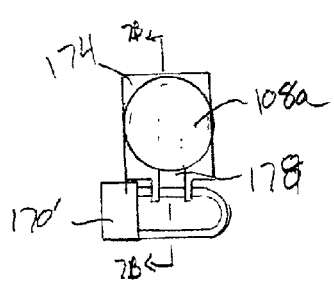
FIG. 7C shows an end view of the mounting pin of FIG. 7B with the locking mechanism mounted thereon.

Finally, FIGS. 7A through 7C show locking mechanisms which can be used with mounting pins to prevent unauthorized removal of the saddlebags. Referring specifically to FIG. 7A, there is shown a side view of a mounting pin 68. Disposed about the head 68a of the mounting pin 68 is a locking mechanism 150 in the form of a cover 154. The cover 154 has a first portion 158 disposed distally of the flange 146 of the mounting pin 68, and a second portion 162 disposed sufficiently proximally of the flange that the second portion prevents the release button 108 from being actuated.

Typically, the first portion 158 and the second portion 162 are attached by a hinge 166. It will be appreciated, however, that the first portion 158 and the second portion 162 could simply be held together by a lock 170 which is used to prevent the first portion and the second portion from being moved away from each other sufficiently to give access to the release button 108. When the lock 170 is in place, the second portion 162 covers the release button 108 and prevents it from being actuated, thereby locking the saddlebag to the motorcycle. To remove the saddlebag, the lock 170 need only be unlocked, and opened to allow the cover 154 to be opened to press the release button 108. In all, unlocking the mounting pin 68 takes no more than a few seconds.

While shown as a separate part from the mounting pin 68, those skilled in the art will appreciate that the cover 154 could be formed as part of the mounting pin. In such a configuration, the second portion 162 could be pivotably attached to the head 68a of the mounting pin 68, thereby causing the head to serve as the first portion.

Turning now to FIGS. 7B and 7B, there are shown a side view and an end view of a mounting pin 168. like the prior mounting pin 68, the release button 108' has an larged head 108a disposed thereon. The advantage of such a configuration is that the head 108a can be designed to be more aesthetically pleasing. In such a configuration, the cover 154 would need to be larger to accept the head 108.

To resolve this concern, the locking mechanism 170 is made from a generally U-shaped piece of material 174 which has a channel 178 for receiving the shaft 108b of the release button. The generally U-shaped piece of material 174 is sufficiently thick to limit movement of the head 108a toward the flange 146' of the pin 168. (The flange 146 may be formed integrally with the pin body or may be a bolt, etc. fastened at the proximal end of the body.) The generally U-shaped piece of material prevents the actuation of the pin 168 to release from the bolt (not shown), as long as the locking mechanism is disposed between the head 108a and the flange 146'.

A lock 170' can be mounted through a pair of holes 178 to prevent removal of the generally U-shaped piece of material without authorization. This, in turn, keeps the saddlebag locked to the motorcycle. By opening the lock and removing the generally U-shaped piece of material, the head 108a of the release button 108 can be depressed, thereby releasing the saddlebags from the motorcycle.

Thus there is disclosed an improved quick release saddlebag system. Those skilled in the art will appreciate numerous modifications which can be made without departing from the scope and spirit of the present invention. The appended claims are intended to cover such modifications.

What is claimed is:

1. A quick release saddlebag system comprising:
    a saddlebag for attachment to a motorcycle; and
    a mounting structure for mounting the saddlebag to the motorcycle, the mounting structure comprising a mounting bolt; a mounting pin having a retractable projection for holding the mounting pin in the mounting bolt; and a release button disposed remotely from the retractable projection for selectively retracting the retractable projection.

2. The quick release saddlebag system of claim 1, wherein the saddlebag system further comprises a saddlebag frame.

3. The quick release saddlebag system of claim 2, wherein the frame comprises an extension arm for engaging the motorcycle and supporting the saddlebag.

4. The quick release saddlebag system of claim 1, wherein the mounting bolt has a head having a hole formed therein for receiving the mounting pin.

5. The quick release saddlebag system of claim 4, wherein the hole has a detent formed therein for receiving the retractable projection from the pin.

6. The quick release saddlebag system of claim 5, wherein the projection comprises at least one ball extending outwardly from the pin.

7. A quick release saddlebag system comprising:
    a saddlebag for attachment to a motorcycle;
    a mounting structure for mounting the saddlebag to the motorcycle, the mounting structure comprising a mounting bolt and a mounting pin having a retractable projection for holding the mounting pin in the mounting bolt;
    wherein the mounting bolt has a head having a hole formed therein for receiving the mounting pin;
    wherein the hole has a detent formed therein for receiving the retractable projection from the pin; and
    wherein the retractable projection comprises at least one ball extending outwardly from the pin.

8. A quick release saddlebag system comprising:
    a saddlebag for attachment to a motorcycle; and
    a mounting structure for mounting the saddlebag to the motorcycle, the mounting structure comprising a mounting bolt and a mounting pin, the mounting pin comprising a retaining ring and a flange, a portion of the mounting pin nesting in the mounting bolt and having a retractable projection retracting into the pin for holding the mounting pin in the mounting bolt.

9. The quick release saddlebag system of claim 8, wherein the saddlebag is mounted on the mounting pin between the retaining ring and the flange.

10. A quick release saddlebag system comprising:
    a saddlebag for attachment to a motorcycle;
    a mounting structure for mounting the saddlebag to the motorcycle, the mounting structure comprising a mounting bolt and a mounting pin having a retractable projection for holding the mounting pin in the mounting bolt; and
    further comprising a frame and wherein the bolt comprises a head having an annular channel formed therein for receiving a portion of the frame.

11. A quick release saddlebag system comprising:
    a saddlebag for attachment to a motorcycle;
    a mounting structure for mounting the saddlebag to the motorcycle, the mounting structure comprising a mounting bolt and a mounting pin having a retractable projection for holding the mounting pin in the mounting bolt; and
    wherein the bolt comprises a head having an annular channel configured for receiving a sissy bar.

12. A quick release saddlebag system comprising:
    a bolt configured for mounting to a fender strut, the bolt having a head with a hole therein configured for receiving a mounting pin;
    a mounting pin configured for nesting in the head of a bolt, the mounting pin having a retaining member for selectively securing the mounting pin in the head of the bolt and a release disposed on the mounting pin for selectively releasing the retaining member; and
    a saddlebag disposed on the mounting pin.

13. A quick release saddlebag system comprising:
    a bolt configured for mounting to a fender strut, the bolt having a head with a hole therein configured for receiving a mounting pin;
    a mounting pin configured for nesting in the head of a bolt, the mounting pin having a retaining member for selectively securing the mounting pin in the head of the bolt and a release disposed on the mounting pin for selectively releasing the retaining member;
    wherein the hole in the mounting bolt bead defines an annular groove.

14. A quick release saddlebag system comprising:
    a bolt configured for mounting to a fender strut, the bolt having a head with a hole therein configured for receiving a mounting pin;
    a mounting pin configured for nesting in the head of a bolt, the mounting pin having a retaining member for selectively securing the mounting pin in the head of the bolt and a release disposed on the mounting pin for selectively releasing the retaining member;
    wherein the hole in the mounting bolt head defines an annular groove; and
    wherein the mounting pin has a body and wherein the retaining member comprises a pair of balls which extend from the body of the mounting pin, the balls being disposable in the annular groove of the mounting bolt head to prevent withdrawal of the mounting pin from the head of the mounting pin.

15. A quick release saddlebag system comprising:
a bolt configured for mounting to a fender strut, the bolt having a head with a hole therein configured for receiving a mounting pin;
a mounting pin configured for nesting in the head of a bolt, the mounting pin having a retaining member for selectively securing the mounting pin in the head of the bolt and a release disposed on the mounting pin for selectively releasing the retaining member; and
further comprising a locking mechanism to prevent removal of the mounting pin from the mounting bolt.

16. A quick release saddlebag system comprising:
a bolt configured for mounting to a fender strut, the bolt having a head with a hole therein configured for receiving a mounting pin;
a mounting pin configured for nesting in the head of a bolt, the mounting pin having a retaining member for selectively securing the mounting pin in the head of the bolt, and further comprising a saddlebag frame, the saddlebag frame comprising an extension arm having a generally U-shaped attachment member for engaging a foot peg of a motorcycle, wherein the extension arm has an adjustable engagement with the generally U-shaped attachment member for thereby adjusting the length of extension arm.

17. A method for mounting a saddlebag on a motorcycle, the method comprising:
attaching a mounting bolt having a head with a hole therein configured to receive a mounting pin to the fender strut of the motorcycle, the hole having a detent formed therein and configured for receiving projections from a mounting pin;
selecting a mounting pin having at least one retractable projection and a saddlebag disposed thereon; and
inserting the mounting pin into the mounting bolt so that the at least one retractable projection of the mounting pin nests in the detent.

18. A method for mounting a saddlebag on a motorcycle, the method comprising:
attaching a mounting bolt having a hole therein configured to receive a mounting pin to the fender strut of the motorcycle, the hole having a detent formed therein and configured for receiving projections from a mounting pin;
selecting a mounting pin having at least one retractable projection and a saddlebag disposed thereon;
inserting the mounting pin into the mounting bolt so that the at least one retractable projection of the mounting pin nests in the detent; and
wherein the method comprises selecting a mounting bolt having a head with a hole formed therein and wherein the detent is an annular groove circumscribing the hole.

19. A method for mounting a saddlebag on a motorcycle, the method comprising:
attaching a mounting bolt having a hole therein configured to receive a mounting pin to the fender strut of the motorcycle, the hole having a detent formed therein and configured for receiving projections from a mounting pin;
selecting a mounting pin having at least one retractable projection and a saddlebag disposed thereon;
inserting the mounting pin into the mounting bolt so that the at least one retractable projection of the mounting pin nests in the detent;
wherein the method comprises selecting a mounting bolt having a head with a hole formed therein and wherein the detent is an annular groove circumscribing the hole; and
wherein the method comprises selecting a mounting pin wherein the at least one retractable projection of the mounting pin comprises a pair of spring loaded balls configured for nesting in the annular groove and a release button for releasing the balls.

20. A method for mounting a saddlebag on a motorcycle, the method comprising:
attaching a mounting bolt having a hole therein configured to receive a mounting pin to the fender strut of the motorcycle;
selecting a mounting pin having a saddlebag disposed thereon; and
inserting the mounting pin into the mounting bolt, wherein the method comprises pressing a release button on the mounting pin to insert the mounting pin into the mounting bolt.

21. A method for mounting a saddlebag on a motorcycle, the method comprising:
attaching a mounting bolt having a hole therein configured to receive a mounting pin to the fender strut of the motorcycle;
selecting a mounting pin having a saddlebag disposed thereon; and
inserting the mounting pin into the mounting bolt, wherein the method comprises releasing the saddlebag from attachment to the mounting bolt by pressing a release button on the mounting pin disposed at an opposing end of the mounting pin from the mounting bolt.

22. A method for mounting a saddlebag on a motorcycle, the method comprising:
attaching a mounting bolt having a hole therein configured to receive a mounting pin to the fender strut of the motorcycle, the hole having a detent formed therein and configured for receiving projections from a mounting pin;
selecting a mounting pin having at least one retractable projection and a saddlebag disposed thereon;
inserting the mounting pin into the mounting bolt so that the at least one retractable projection of the mounting pin nests in the detent; and
further comprising using a locking mechanism to prevent removal of the saddlebag from the mounting bolts.

23. A method for removing a saddlebag from a motorcycle, the method comprising:
selecting a saddlebag carried on a mounting pin which is anchored in a mounting bolt attached to a motorcycle; and
pressing a release button on the mounting pin and pulling the mounting pin out of the mounting bolt to detach the saddlebag from the motorcycle.

24. A quick release saddlebag system comprising:
a saddlebag for attachment to a motorcycle; and
a mounting structure for mounting the saddlebag to the motorcycle, the mounting structure comprising a mounting bolt having a hole disposed therein, the hole having an annular recessed groove therein configured for receiving a retractable projection from a mounting pin and a mounting pin having a retractable projection.

* * * * *